(12) United States Patent
Haruna

(10) Patent No.: US 6,641,127 B2
(45) Date of Patent: Nov. 4, 2003

(54) CLAMPING APPARATUS

(75) Inventor: Yosuke Haruna, Kobe (JP)

(73) Assignee: Kabushiki Kaisha Kosmek, Hyogo (JP)

( * ) Notice: Subject to any disclaimer, the term of this patent is extended or adjusted under 35 U.S.C. 154(b) by 0 days.

(21) Appl. No.: 10/269,429

(22) Filed: Oct. 11, 2002

(65) Prior Publication Data
US 2003/0071407 A1 Apr. 17, 2003

(30) Foreign Application Priority Data
Oct. 12, 2001 (JP) .................................. P 2001-314972

(51) Int. Cl.[7] .................................................. B23Q 3/00
(52) U.S. Cl. .................. 269/309; 269/310; 269/900
(58) Field of Search ........................ 269/309, 310, 269/48.1, 234; 279/4.12, 121; 228/49.3

(56) References Cited

U.S. PATENT DOCUMENTS

| 5,184,810 A | | 2/1993 | Lebrecht | |
|---|---|---|---|---|
| 5,190,272 A | * | 3/1993 | Zika et al. | 269/309 |
| 5,415,384 A | * | 5/1995 | Obrist et al. | 269/309 |
| 5,634,757 A | | 6/1997 | Schanz | |
| 5,961,261 A | * | 10/1999 | Stark | 269/309 |
| 6,024,354 A | * | 2/2000 | Yonezawa | 269/309 |
| 6,089,557 A | * | 7/2000 | Obrist | 269/309 |
| 6,139,002 A | | 10/2000 | Stark | |
| 6,161,826 A | | 12/2000 | Forrer | |
| 2001/0022420 A1 | * | 9/2001 | Etter | 269/309 |

FOREIGN PATENT DOCUMENTS

| EP | 1 078 713 A1 | 2/2001 |
|---|---|---|
| JP | 11-10468 A | 1/1999 |

OTHER PUBLICATIONS

U.S. patent application No. 09/631,670.
U.S. patent application No. 10/163,274, filed Jun. 4, 2002.

* cited by examiner

*Primary Examiner*—Lee D. Wilson
(74) *Attorney, Agent, or Firm*—Akin, Gump, Strauss, Hauer & Feld, L.L.P.

(57) ABSTRACT

Two positioning devices (4, 5) are horizontally spaced apart from two clamping devices (6, 6) at a predetermined interval. Each of the positioning devices (4, 5) includes a positioning hole (23) provided by opening a work pallet (2), a plug portion (27) projecting from a clamp pallet (1), and an intermediate member (30) vertically movably supported by the plug portion (27). The intermediate member (30) is urged upwards by a coned disk spring (31) and has a tapered surface (33) which makes a tapering engagement with the positioning hole (23). The clamping device (6) fixes the work pallet (2) to the clamp pallet (1).

6 Claims, 4 Drawing Sheets

CLAMPING APPARATUS

BACKGROUND OF THE INVENTION

1. Field of the Invention

The present invention relates to a clamping apparatus, for example, an apparatus suitable for positioning and fixing a work pallet to a table of a machine tool or a clamp pallet.

2. Explanation of Related Art

A conventional example of the clamping apparatus of this king was disclosed in Japanese Patent Public Disclosure No. 11-10468. The conventional technique is constructed as follows.

A plurality of positioning pins project downwards from a peripheral portion of an under surface of a work pallet. When clamping, first, the work pallet is positioned to an upper surface of a table of a machine tool through the plurality of positioning pins and then a cylinder provided on the table pulls a nipple of the work pallet, thereby fixing the work pallet to the table.

However, the conventional technique requires a horizontal fitting gap between the respective positioning pins and the respective contact surfaces of the table so as to smoothly attach the work pallet to the table. The existence of the fitting gap decreases the positioning preciseness of the work pallet with respect to the table.

SUMMARY OF THE INVENTION

The present invention has an object making it possible to smoothly and precisely position and fix a work pallet or the like second block to a table, a clamp pallet or the like first block.

In order to accomplish the object, the present invention has constructed a clamping apparatus, for example, as shown in FIGS. 1A to 1C, FIG. 2 and FIG. 3 or in FIG. 4.

The clamping apparatus positions and fixes a second block 2 to a first block 1. A plurality of positioning means 4, 5 and at least one clamping means 6 are spaced apart from each other. Each of the positioning means 4, 5 includes a positioning hole 23 provided by opening the second block 2, a plug portion 27 projecting from the first block 1 so as to be inserted into the positioning hole 23, and an intermediate member 30 interposed between the plug portion 27 and the positioning hole 23 and able to diametrically expand and contract. The intermediate member 30 is supported by one of the plug portion 27 and the positioning hole 23 axially and movably within a predetermined range and can make a tapering engagement with the other. The intermediate member 30 has a tapered surface 33 which is formed so as to narrow toward an inner portion of the positioning hole 23. The intermediate member 30 is urged by a resilient member 31 in a direction for tightening the tapering engagement. The clamping means 6 pulls the second block 2 to the first block 1.

The present invention, for instance, functions as follows.

When fixing a work pallet or the like second block to a table, a clamp pallet or the like first block, the both blocks are made to approach to one another. First, the plurality of positioning means position the both blocks and then at least one clamping means fixes the both blocks.

More specifically, first, the tapered surface of the intermediate member of every positioning means exerts a guide action, which allows the corresponding each positioning hole to automatically make an aligning movement. Accordingly, each of the positioning holes has an axis precisely coincident with an axis of every plug portion of the first block. A supported surface of the second block contacts or approaches a supporting surface of the first block. Thereafter, the clamping means pulls the second block to the first block, thereby pushing the supported surface to the supporting surface.

Owing to the above arrangement, the second block is constrained by the plug portions through the tapered surfaces of the intermediate members as well as by the supporting surface.

Thus it is possible to smoothly and precisely position and fix the second block to the first block. Besides, in order to achieve the advantage, the positioning means and the clamping means are provided independently. Therefore, each of these means can be readily formed with a simple structure to result in the possibility of manufacturing whole the clamping apparatus at a low cost.

Further, as mentioned above, the positioning means and the clamping means are provided independently. In consequence, when compared with a clamping apparatus where those both means are provided in series with each other, it is possible to reduce a projection height of the table, the clamp pallet or the like first block. When replacing the work pallet or the like second block, this dispenses with the necessity of largely lifting the second block. Additionally, it simplifies a structure of a device for lifting the second block.

The present invention includes the following apparatus.

For example, as shown in FIG. 2 or FIG. 4, the positioning hole 23 is formed by a tapered surface. The tapered positioning hole 23 can make a tapering engagement with the tapered surface 33 of the intermediate member 30. The intermediate member 30 has an inner peripheral surface defined by a straight surface 32. The straight surface 32 is supported by the plug portion 27 axially movably.

The present invention is equipped with the intermediate member in the plug portion of the first block. Therefore, when attaching and detaching a large number of second blocks to one first block, it suffices if the intermediate member is equipped in a smaller number, which results in being able to simplify the structure of the clamping apparatus.

Further, the present invention includes the following clamping apparatus.

For example, as shown in FIG. 3, the clamping means 6 comprises an engaged hole 48 provided in the second block 2, an annular wall 59 projecting from the first block 1 so as to be inserted into the engaged hole 48, a pull rod 61 inserted into the annular wall 59, and an engaging member 63 supported by the annular wall 59. The pull rod 61 is driven for clamping toward a base end, thereby enabling an output portion 64 of the pull rod 61 to pull the second block 2 to the first block 1 through the engaging member 63 and the engaged hole 48.

Moreover, the present invention includes the following clamping apparatus.

For instance, as shown in FIG. 4, the clamping means 6 includes a female screw 79 provided in the first block 1 and a fastening bolt 81 which is attached to the second block 2. The female screw 79 engages with the fastening bolt 81 in screw-thread relationship, thereby allowing the fastening bolt 81 to pull the second block 2 to the first block 1.

BRIEF DESCRIPTION OF THE DRAWINGS

FIG. 1A is a schematic view when seen in elevation of the clamping apparatus;

FIG. 1B is a view when seen along a line 1B—1B in FIG. 1A in a direction indicated by arrows;

FIG. 1C is a view when seen along a line 1C—1C in FIG. 1A in a direction indicated by arrows;

FIG. 2 is a vertical sectional view of a positioning means provided in the clamping apparatus;

FIG. 3 is a vertical sectional view of a clamping means provided in the clamping apparatus;

DESCRIPTION OF THE PREFERRED EMBODIMENTS

FIGS. 1A to FIG. 1C, FIG. 2 and FIG. 3 show a first embodiment of the present invention.

Figure 1:
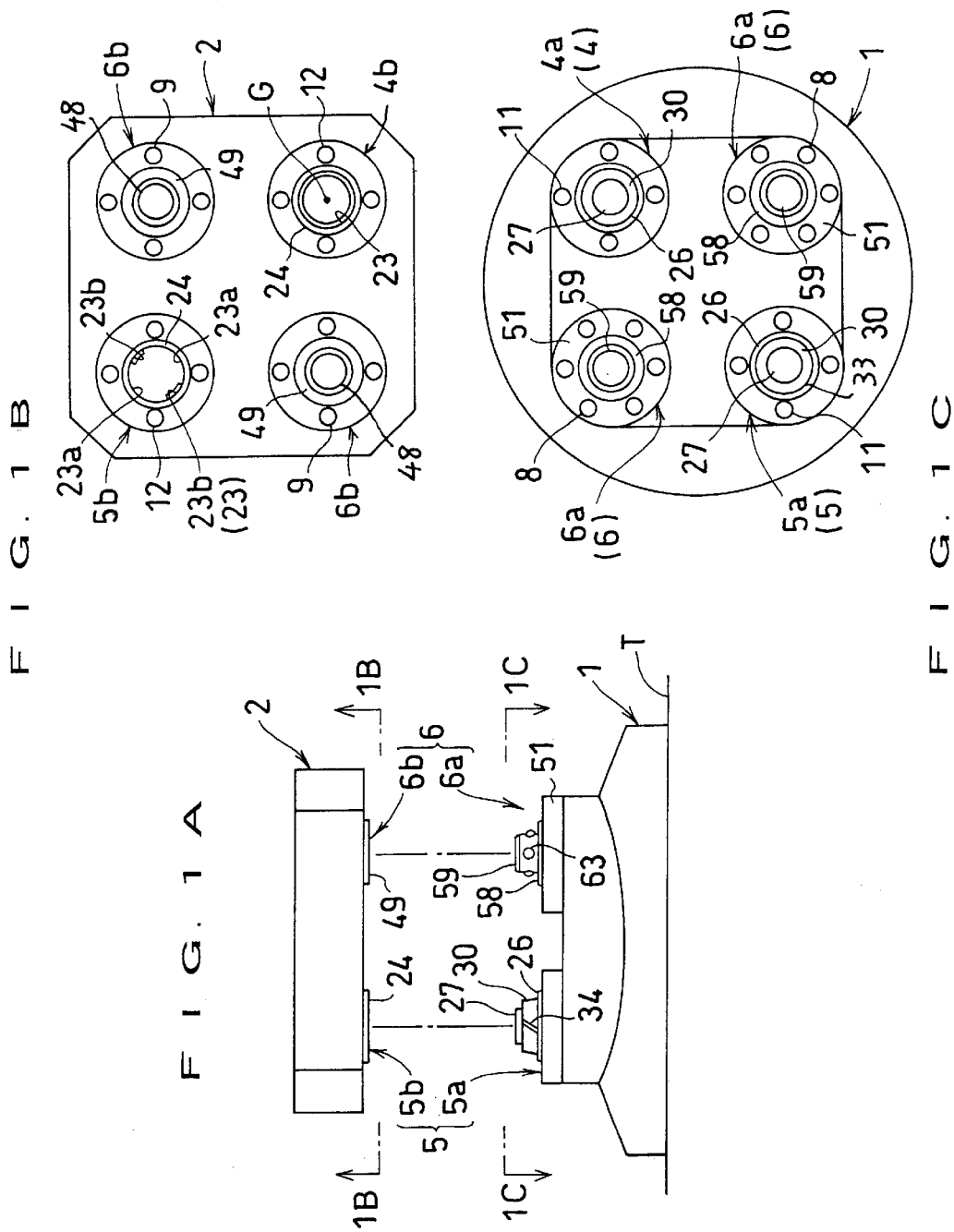
FIGS. 1A to 1C, FIG. 2 and FIG. 3 show a clamping apparatus according to a first embodiment of the present invention.

First, an explanation is given for an outline of a clamping apparatus utilizing the present invention by relying on schematic views of FIG. 1A to FIG. 1C.

A clamp pallet 1 of a first block is fixedly provided on an upper surface of a table (T) of a machining center. A work pallet 2 of a second block is positioned and fixed to the clamp pallet 1 by a first and a second positioning means 4, 5, and two clamping means 6, 6.

The two positioning means 4, 5 are arranged diagonally as well as the two clamping means 6, 6. Each of the clamping means 6 has only a clamping function. And it comprises a clamp 6a fixed to the clamp pallet 1 through a plurality of bolts 8 and a driven ring 6b fixed to the work pallet 2 through a plurality of bolts 9.

Although not shown, a plurality of workpieces can be attached and detached to an upper surface of the work pallet 2 by another clamping means.

The first positioning means 4 comprises a first housing 4a fixed to the clamp pallet 1 through a plurality of bolts 11 and a first ring 4b fixed to the work pallet 2 through a plurality of bolts 12. And as shown in FIG. 2 to be mentioned later, an intermediate member 30 is externally fitted on a plug portion 27 of the first housing 4a and has a tapered surface 33 with respect to which a positioning hole 23 of the first ring 4b can be precisely fitted on a reference axis (G) (see FIG. 1B).

The second positioning means 5 is constructed substantially similar to the first positioning means 4. It comprises a second housing 5a fixed to the clamp pallet 1 and a second ring 5b fixed to the work pallet 2. As shown in FIG. 1B, the second ring 5b is different from the first ring 4b in that the positioning hole 23 is concaved to form a pair of relief surfaces 23a, 23a.

And the intermediate member 30 externally fitted onto the plug portion 27 of the second housing 5a has the tapered surface 33 with respect to which remaining portions 23b, 23b of the positioning hole 23 of the second ring 5b are fitted, thereby allowing the work pallet 2 to precisely position with respect to the reference axis (G) in a peripheral direction. At the same time, the existence of the relief surfaces 23a, 23a can absorb a radial error with respect to the reference axis (G).

Figure 2:
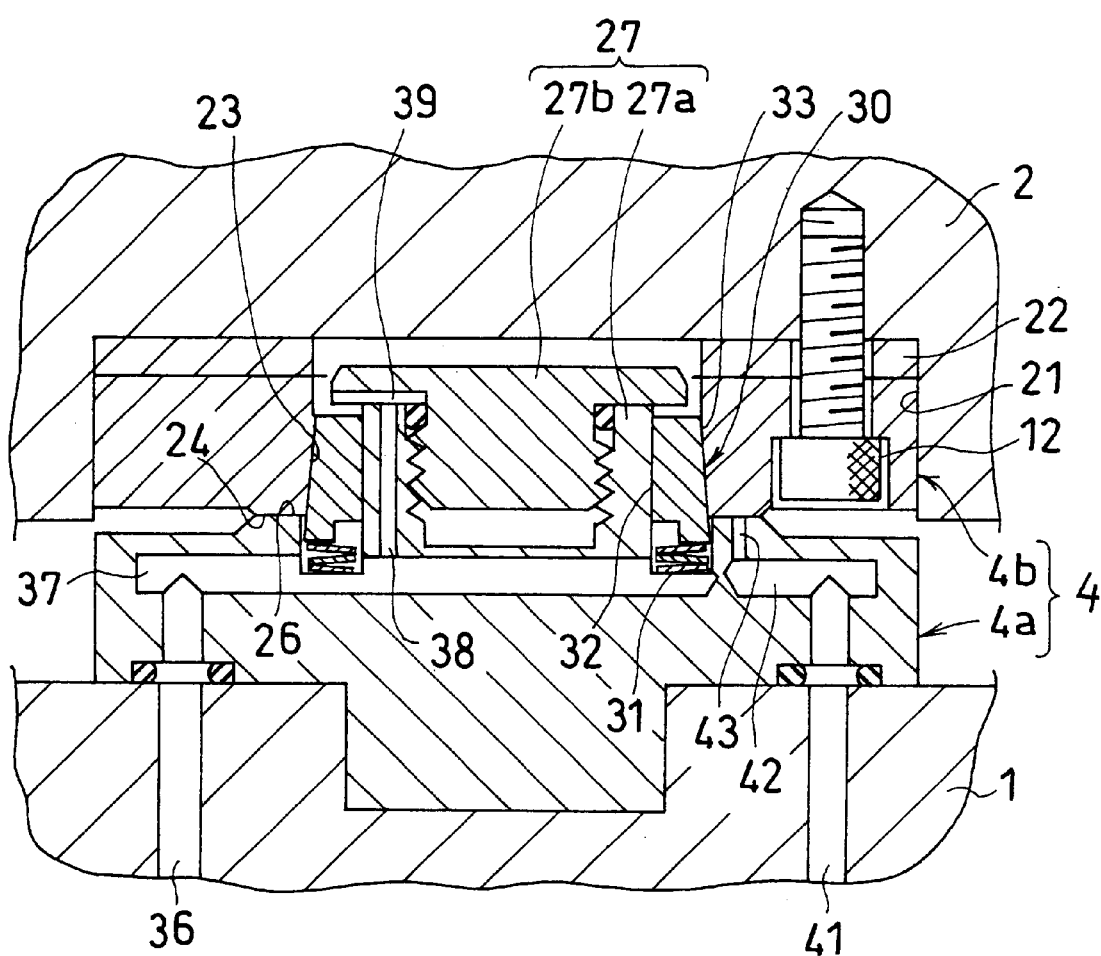

A concrete structure of the first positioning means 4 is explained by relying on FIG. 2. FIG. 2 is a vertical sectional view of the positioning means 4 and shows a state where the work pallet 2 is attached to the clamp pallet 1. The second positioning means 5 is constructed substantially similar to the first positioning means 4 as mentioned above. Accordingly, an explanation therefor is omitted.

The work pallet 2 has an under surface opened to provide a first circular bore 21 facing downwards. A spacer 22 and the first ring 4b are fixed to the first circular bore 21 through the plurality of bolts 12. The first ring 4b is formed with the positioning hole 23 composed of a tapered hole so that the positioning hole 23 narrows upwardly. The positioning hole 23 has on an under surface of its peripheral wall an annular projection which defines a supported surface 24.

The first housing 4a has an upward projection at its radial halfway portion. The annular projection has an upper surface which defines a supporting surface 26. The plug portion 27 projects upwards from a mid portion of the first housing 4a. And it comprises a cylindrical body 27a and a closure bolt 27b hermetically fitted into the cylindrical body 27a in screw-thread engagement. The plug portion 27 is inserted into the positioning hole 23.

The annular intermediate member 30 is externally fitted onto the cylindrical body 27a vertically movably. The intermediate member 30 is urged upward by three coned disk springs (resilient member) 31 and can be received by the closure bolt 27b.

More specifically, the annular intermediate member 30 has an inner peripheral surface defined by a straight surface 32 and an outer peripheral surface formed by a tapered surface 33. Here the intermediate member 30 has its annular wall provided with a slit 34 (see FIG. 1A) so that the tapered surface 33 and the straight surface 32 can diametrically expand and contract. The straight surface 32 is axially movably supported by an outer peripheral surface of the cylindrical body 27a of the plug portion 27. The tapered surface 33 is formed so as to narrow upwards in order that it makes a tapering engagement with the positioning hole 23.

Compressed air for cleaning the first positioning means 4 passes through a first vertical passage 36 of the clamp pallet 1, a first horizontal passage 37 within the first housing 4a, and an upward passage 38 within a peripheral wall of the plug portion 27 to be horizontally discharged from a horizontal groove 39 of the closure bolt 27b. Further, it passes from the first horizontal passage 37 through a fitting gap of the straight surface 32 of the intermediate member 30 and a fitting gap of the tapered surface 33 thereof so that it can be blown out to an exterior area.

Besides, compressed air for confirming the seating is supplied to a first outlet nozzle 43 through a second vertical passage 41 of the clamp pallet 1 and a second horizontal passage 42 within the first housing 4a. The first outlet nozzle 43 is provided by opening the supporting surface 26.

Figure 3:
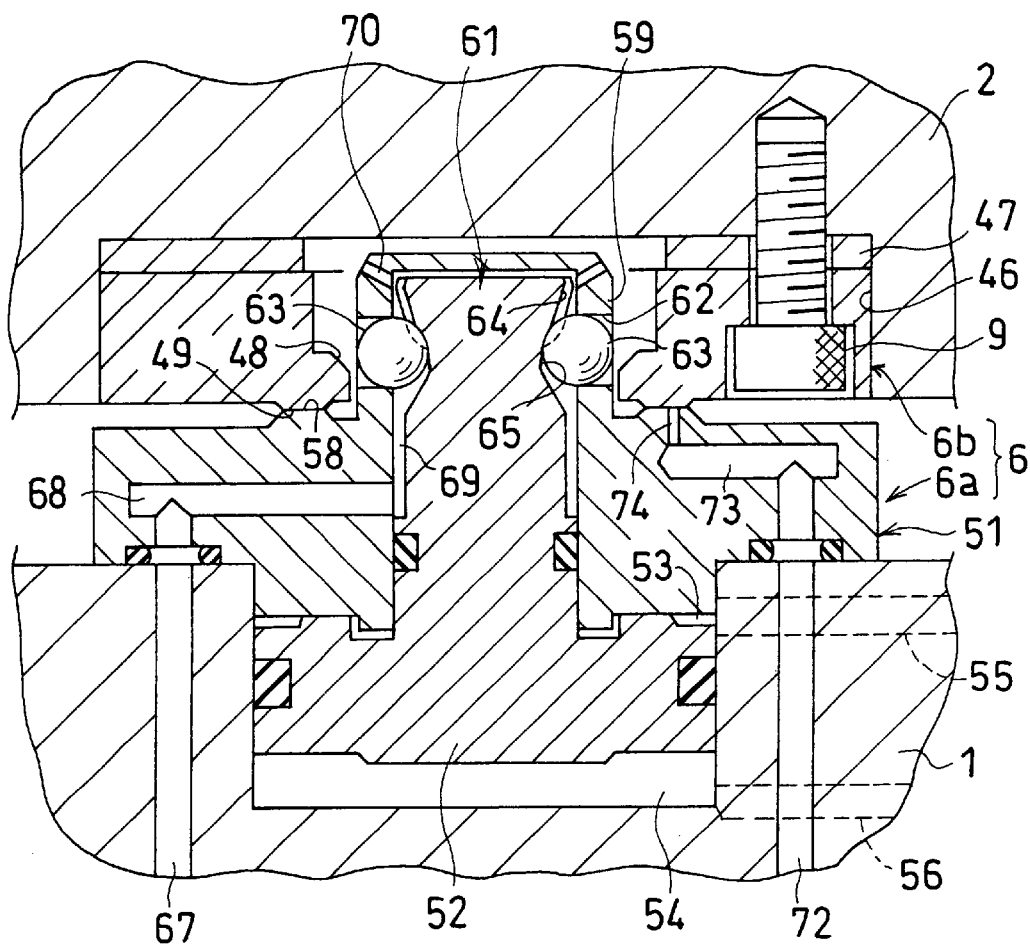

A concrete structure of the clamping means 6 is explained by resorting to FIG. 3. FIG. 3 is a vertical sectional view of the clamping means 6 and shows a state where the work pallet 2 is attached to the clamp pallet 1.

The work pallet 2 has the under surface opened to provide a second circular bore 46 facing downwards. A spacer 47 and the driven ring 6b are fixed to the second circular bore 46 through the plurality of bolts 9. The driven ring 6b has a lower portion provided with an annular engaged portion (engaged hole) 48 which is composed of a tapered surface, and with an annular supported surface 49.

The clamp 6a includes a clamp housing 51 fixed to the clamp pallet 1, a piston 52 hermetically inserted into the housing 51 and the clamp pallet 1, a clamping actuation chamber 53 formed upwards of the piston 52, and an unclamping actuation chamber 54 formed downwards of the piston 52. Numeral 55 indicates a first supply and discharge port. Numeral 56 designates a second supply and discharge port.

The clamp housing 51 has an upward projection at its radial halfway portion. The annular projection has an upper surface which defines a supporting surface 58. An annular wall 59 projects upwards from a mid portion of the housing 51. The annular wall 59 is inserted into the driven ring 6b.

The annular wall 59 has a cylindrical hole into which a pull rod 61 is vertically movably inserted. The pull rod 61 is formed integrally with the piston 52. The annular wall 59 has a halfway height portion formed with a plurality of through holes 62 peripherally spaced apart from each other at a predetermined interval. Every through hole 62 supports an engaging ball (engaging member) 63 movably between a radially outward engaging position and a radially inward disengaging position. Each ball 63 is prevented from jumping out by a radially reduced portion (not shown) at an external end of every through hole 62.

The pull rod 61 has an outer peripheral surface at an upper portion of which a pushing surface (output portion) 64 and a retreating groove 65 are formed in vertical continuity with each other in correspondence with every ball 63 Compressed air for cleaning the clamping means 6 passes through a third vertical passage 67 of the clamp pallet 1, a third horizontal passage 68 within the clamp housing 51, and an annular gap 69 between the annular wall 59 and the pull rod 61, to be discharged obliquely and upwardly from a plurality of blowout holes 70 at an upper portion of the annular wall 59.

Besides, compressed air for confirming the seating is supplied to a second outlet nozzle 74 via a fourth vertical passage 72 of the clamp pallet 1 and a fourth horizontal passage 73 within the housing 51. The second outlet nozzle 74 is provided by opening the supporting surface 58.

As for the clamping apparatus of the foregoing construction, as shown in FIG. 1B, the two positioning holes 23 are horizontally spaced apart from the two engaged portions 48 at a predetermined interval in the work pallet 2. As shown in FIG. 1C, the two plug portions 27 are horizontally spaced apart from the two annular walls 59 at a predetermined interval. The clamping apparatus is used as follows.

Under an unclamping condition shown in FIG. 1A, the clamping actuation chamber 53 discharges pressurized oil and the pressurized oil is supplied to the unclamping actuation chamber 54. Then the piston 52 raises the pull rod 61 and every engaging ball 63 opposes to the retreating groove 65 (see FIG. 3). Therefore, every engaging ball 63 is made free in a horizontal direction to become movable to the inward disengaging position. Further, the intermediate member 30 is held at a raised position by an urging force of the coned disk springs 31 (see FIG. 1A).

And when the work pallet 2 under the condition shown in FIG. 1A descends by its own weight, as shown in FIG. 2, first, the positioning hole 23 makes the tapering engagement with the tapered surface 33 on an outer periphery of the intermediate member 30 and moves while aligning. The positioning hole 23 precisely coincides with an axis of the plug portion 27 and the intermediate member 30 slightly descends against the urging force of the coned disk springs 31. The first ring 4b (and the second ring 5b) have their supported surfaces 24 brought into contact with the supporting surfaces 26 of the first housing 4a (and the second housing 5a).

Substantially at the same time as the supported surfaces 24 are brought into contact with the supporting surfaces 26, as shown in FIG. 3, it is preferable to bring the supported surface 49 of the driven ring 6b into contact with the supporting surface 58 of the clamp housing 51. However, instead, a slight contact gap may be formed between the supported surface 49 and the supporting surface 58.

Next, the clamping means 6 under the unclamping condition in FIG. 3 is switched over to a clamping condition. More specifically, the unclamping actuation chamber 54 discharges pressurized oil and the pressurized oil is supplied to the clamping actuation chamber 53. Then the piston 52 lowers the pull rod 61. Every pushing surface 64 of the pull rod 61 pushes every engaging ball 63 to the radially outward engaging position (not shown). The radial pushing force is converted to a downward force through the engaged portion 48 and the downward force pushes the work pallet 2 to the clamp pallet 1.

Due to the above fact, the work pallet 2 is constrained horizontally by the plug portion 27 through the intermediate member 30 which has been diametrically contracted by the positioning hole 23, as well as vertically by the supporting surface 26 (and the supporting surface 58). As a result, the work pallet 2 can be precisely positioned and fixed to the clamp pallet 1.

At the end of-the descent of the work pallet 2, the cleaning compressed air sufficiently cleans the positioning hole 23, the straight surface 32 and the tapered surface 33 of the intermediate member 30, and the engaged portion 48 as well as the supported surfaces 24, 49 and the supporting surfaces 26, 58.

Further, when the supported surfaces 24, 49 are brought into contact with the supporting surfaces 26, 58, the respective outlet nozzles 43, 74 are closed. Thus the compressed air for confirming the seating, which has been supplied to the second vertical passage 41 and the fourth vertical passage 72, increases its pressure. The pressure increase is detected by a pressure sensor (not shown) to thereby be able to confirm the contact state.

When switching over from the clamping condition to the unclamping condition, as shown in FIG. 3, an oil pressure force of the unclamping actuation chamber 54 raises the pull rod 61 through the piston 52. Then every engaging ball 63 faces the retreating groove 65, thereby being allowed to switch over to the disengaging position. (FIG. 3 shows it has been already switched over.) In this state, as shown in FIG. 1A, it is sufficient if the work pallet 2 is raised.

The first embodiment offers the following advantage.

The positioning means 4(5) and the clamping means 6 are provided independently and are horizontally spaced apart from each other at a predetermined interval. When compared with a clamping apparatus in which the positioning means 4(5) are provided vertically in series with the clamping means 6, the plug portion 27 and the annular wall 59 project from the upper surface of the clamp pallet 1 in a reduced height. This dispenses with the necessity for largely lifting the work pallet 2 when replacing the work pallet 2 and besides simplifies the structure of the device for lifting the work pallet 2.

The above first embodiment can be modified as follows.

As shown in FIG. 2, when the work pallet 2 has been lowered, the intermediate member 30 slightly descends against the urging force of the coned disk springs 31 to bring the supported surface 24 into contact with the supporting surface 26. However, instead, in a state where the intermediate member 30 has descended, there is formed a slight contact gap between the supported surface 24 and the supporting surface 26. When the clamping means 6 carries out the clamping actuation, the both surfaces 24, 26 may be made to strongly contact with each other.

The positioning means 4, 5 may be provided in at least three sets instead of two sets. Further, the clamping means 6 may be provided in one set or at least three sets instead of two sets.

The clamping means 6 is sufficient if it pulls the work pallet 2 to the clamp pallet 1. As a matter of course, it is not limited to the exemplified structure. For example, the clamping means 6 may be formed into a structure of single-acting type instead of the exemplified structure of double-acting type. As for the structure of single-acting type, a spring-return type and a spring-clamp type are considered. The working fluid for the clamping means 6 may be other kinds of liquid and compressed air or the like gas instead of the pressurized oil.

Figure 4:
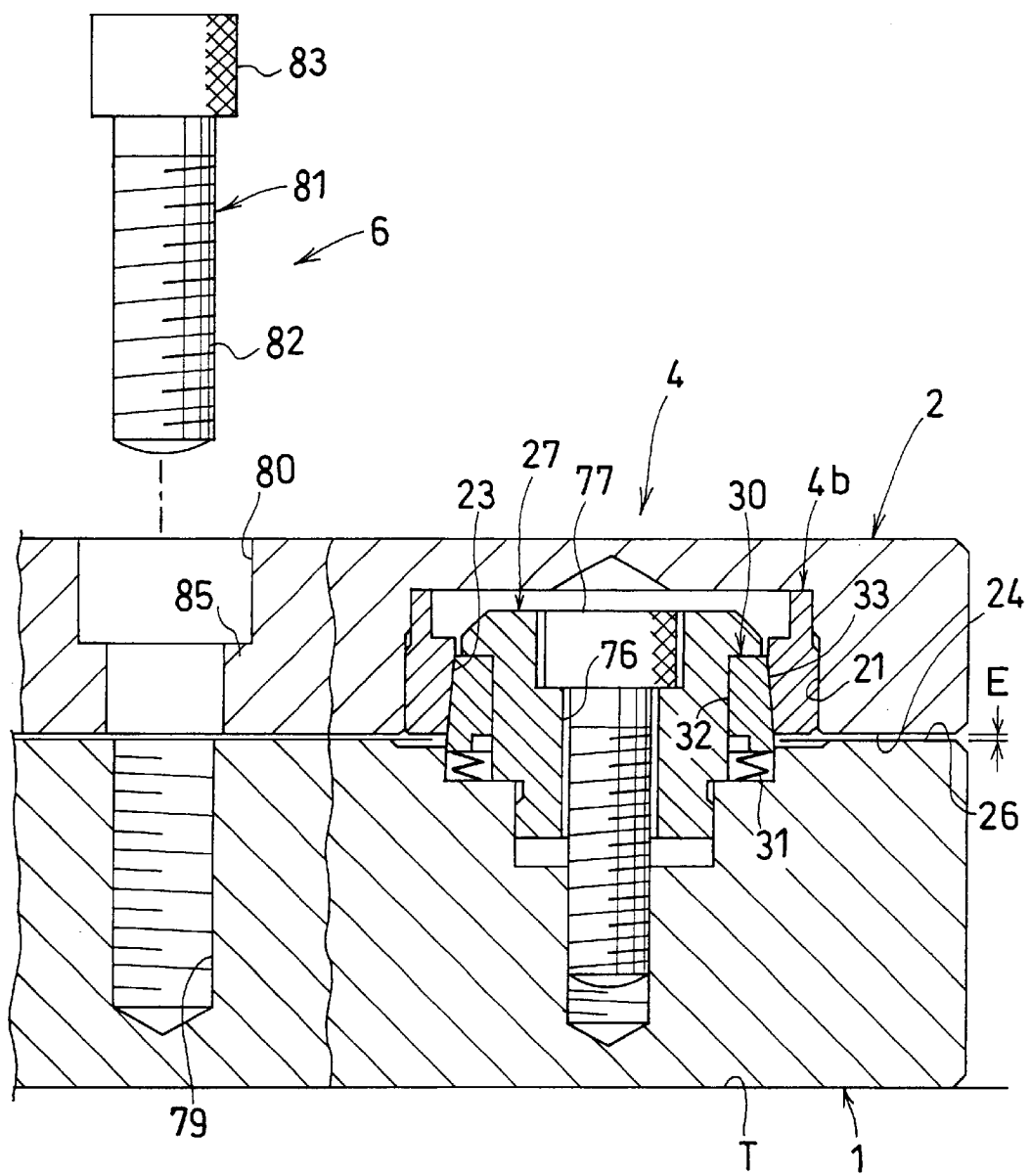
FIG. 4 is a clamping apparatus according to a second embodiment of the present invention and is similar to FIGS. 2 and 3.

FIG. 4 shows a clamping apparatus according to a second embodiment of the present invention and is similar to FIGS. 2 and 3. In this second embodiment, the same constituent members as those of the first embodiment are, in principle, designated by the same characters. An explanation is given for a structure different from that of the first embodiment.

The first positioning means 4 is constructed as follows.

The first ring 4b is press fitted into the first circular bore 21 and is fixed thereto. The plug portion 27 is formed cylindrical to provide a cylindrical hole 76, into which an attaching bolt 77 is inserted. The bolt 77 pushes and fixes the plug portion 27 to the clamp pallet 1.

The clamping means 6 includes a female screw 79 provided by opening an upper surface of the clamp pallet 1 and a fastening bolt 81 which is inserted into a stepped through hole 80 of the work pallet 2.

The clamping apparatus of the second embodiment is used as follows.

When the work pallet 2 descends by its own weight, first, as shown in FIG. 4, the positioning hole 23 makes the tapering engagement with the tapered surface 33 of the intermediate member 30 and moves while aligning. The positioning hole 23 precisely coincides with the axis of the plug portion 27. In this case, the intermediate member 30 is held at a raised position by the urging force of the coned disk springs 31. A contact gap (E) is formed between the supported surface 24 of the work pallet 2 and the supporting surface 26 of the clamp pallet 1.

Next, the fastening bolt 81 has a threaded leg 82, which is put into screw-thread engagement with the female screw 79. The fastening bolt 81 has a head portion 83, which pushes a shoulder portion 85 of the through hole 80 downwards. This enables the fastening bolt 81 to pull the work pallet 2 to the clamp pallet 1. The positioning hole 23 lowers the intermediate member 30 against the coned disk springs 31 to bring the supported surface 24 into contact with the supporting surface 26. As a result, the work pallet 2 is constrained through the intermediate member 30 which has been diametrically contracted, horizontally by the plug portion 27 as well as vertically by the supporting surface 26.

In the respective clamping apparatuses of the first and second embodiments, it is preferable to separate the clamp pallet 1 and the work pallet 2 under the clamping condition, from each other according to the following procedures.

First, the clamping means 6 is released from the clamping condition. Next, for example, a push bolt (not shown) which engages with the work pallet 2 in screw-thread relationship, is pushed to an upper surface of the clamp pallet 1, or the like operation is conducted, thereby cancelling the tapering engagement between the tapered surface 33 of the intermediate member 30 and the positioning hole 23. Thereafter, the work pallet 2 is raised.

The clamping apparatuses of the foregoing respective embodiments can be further modified as follows.

The intermediate member 30 may be supported by the first ring 4b instead of by the plug portion 27. In this case, the positioning hole 23 is formed straight. The straight positioning hole 23 vertically movably supports a straight surface on an outer periphery of the intermediate member. And the intermediate member is urged downwards by a resilient member. The intermediate member has an inner surface formed with a tapered surface, which makes a tapering engagement with an outer peripheral surface of the plug portion. The tapered surface is formed so as to narrow upwards.

The resilient member for urging the intermediate member 30 may be a compressed spring, a rubber or the like instead of the exemplified coned disk spring 31.

The intermediate member 30 is satisfactory if it diametrically expands and contracts. In consequence, instead of providing the exemplified slit 34 (see FIG. 1A) in the annular body, the annular body may be provided with an upper groove and a lower groove alternatively in a peripheral direction or may have an inner peripheral surface provided with a groove extending vertically. And other various kinds of structures are employable. Further, the intermediate member 30 is not limited to the exemplified annular body, but it may be a plurality of segments arranged annularly.

The first block may be a table of a machining center or tables of various kinds of machines instead of the exemplified clamp pallet 1. Further, the second block may be a workpiece instead of the exemplified work pallet 2. The first block and the second block may be arranged in a vertically reversed manner. They may be connected to each other horizontally or obliquely instead of connecting them to one another vertically as exemplified.

What is claimed is:

1. A clamping apparatus which positions and fixes a second block (2) to a first block (1), the clamping apparatus comprising:

a plurality of positioning means (4, 5) and at least one clamping means (6) spaced apart from each other, the at least one clamping means (6) pulling the second block (2) to the first block (1);

each of the positioning means (4, 5) including a positioning hole (23) provided by an opening in the second block (2) and having an inner portion, a plug portion (27) projecting from the first block (1) so as to be inserted into the positioning hole (23), and an intermediate member (30) interposed between the plug portion (27) and the positioning hole (23) and able to diametrically expand and contract;

the intermediate member (30) having a tapered surface (33), and supported by one of the plug portion (27) and the positioning hole (23), the intermediate member being axially movable within a predetermined range and able to make a tapering engagement with the other of the plug portion and the positioning hole, the tapered surface (33) being formed so as to narrow toward the inner portion of the positioning hole (23); and a resilient member (31) urging the intermediate member (30) in a direction which tightens the tapering engagement.

2. The clamping apparatus of claim 1, wherein the intermediate member (30) has an inner peripheral surface and an outer peripheral surface, the inner peripheral surface being formed by a straight surface (32) and the outer peripheral surface being defined by the tapered surface (33), the straight surface (32) being supported by the plug portion (27) and axially movable, the positioning hole (23) being defined by a tapered surface, the tapered surface of the positioning hole (23) engaging with the tapered surface (33) of the intermediate member (30).

3. The clamping apparatus of claim 2, wherein the at least one clamping means (6) includes an engaged hole (48) provided in the second block (2), an annular wall (59) projecting from the first block (1) so as to be inserted into the engaged hole (48), a pull rod (61) inserted into the annular wall (59) and having an output portion (64), and an engaging member (63) supported by the annular wall (59), the pull rod (61) being driven for clamping toward a base end, thereby enabling the output portion (64) of the pull rod (61) to pull the second block (2) to the first block (1) through the engaging member (63) and the engaged hole (48).

4. The clamping apparatus of claim 2, wherein the at least one clamping means (6) includes a female screw (79) provided in the first block (1) and a fastening bolt (81) attached to the second block (2), the female screw (79) engaging with the fastening bolt (81) in a screw-thread relationship, thereby allowing the fastening bolt (81) to pull the second block (2) to the first block (1).

5. The clamping apparatus of claim 1, wherein the at least one clamping means (6) includes an engaged hole (48) provided in the second block (2), an annular wall (59) projecting from the first block (1) so as to be inserted into the engaged hole (48), a pull rod (61) inserted into the annular wall (59) and having an output portion (64), and an engaging member (63) supported by the annular wall (59), the pull rod (61) being driven for clamping toward a base end, thereby enabling the output portion (64) of the pull rod (61) to pull the second block (2) to the first block (1) through the engaging member (63) and the engaged hole (48).

6. The clamping apparatus of claim 1, wherein the at least one clamping means (6) includes a female screw (79) provided in the first block (1) and a fastening bolt (81) attached to the second block (2), the female screw (79) engaging with the fastening bolt (81) in a screw-thread relationship, thereby allowing the fastening bolt (81) to pull the second block (2) to the first block (1).

* * * * *